United States Patent
Wise

(10) Patent No.: US 10,532,826 B2
(45) Date of Patent: *Jan. 14, 2020

(54) LIGHTING AND COLLISION ALERTING SYSTEM

(71) Applicant: Hughey & Phillips, LLC, Urbana, OH (US)

(72) Inventor: Eric W. Wise, Enon, OH (US)

(73) Assignee: Hughey & Phillips, LLC, Urbana, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,129

(22) Filed: Nov. 12, 2018

(65) Prior Publication Data

US 2019/0168890 A1 Jun. 6, 2019

Related U.S. Application Data

(63) Continuation of application No. 15/641,290, filed on Jul. 4, 2017, now Pat. No. 10,124,910, which is a (Continued)

(51) Int. Cl.
*B64F 1/20* (2006.01)
*F21V 7/04* (2006.01)
(Continued)

(52) U.S. Cl.
CPC ............... *B64F 1/20* (2013.01); *F21S 8/032* (2013.01); *F21V 7/041* (2013.01); *F21V 7/048* (2013.01);
(Continued)

(58) Field of Classification Search
CPC .... B64F 1/18; B64F 1/20; F21S 8/032; F21V 7/041; F21V 7/048; G08G 5/04;
(Continued)

(56) References Cited

U.S. PATENT DOCUMENTS 4,498,004 A 2/1985 Adolfsson et al.
4,609,306 A 9/1986 Loire
(Continued)

FOREIGN PATENT DOCUMENTS

CN 201636748 U 11/2010
EP 1231109 A1 8/2002
(Continued)

OTHER PUBLICATIONS

European Search Report, Application EP12182139, dated Dec. 12, 2013.
(Continued)

*Primary Examiner* — Hung T Nguyen
(74) *Attorney, Agent, or Firm* — Lorraine Hernandez; Kegler Brown Hill + Ritter, LLP, Co.

(57) ABSTRACT

A collision avoidance system includes a sensor adapted to detect at least one vehicle in the vicinity of a predetermined area and generate target data relating to the at least one vehicle. An awareness engine receives the target data and evaluates the target data for a threat of a collision. An alerting system is adapted to alert the at least one vehicle in the event of a threat of a collision, the alerting system being activated by the awareness engine.

20 Claims, 12 Drawing Sheets

Related U.S. Application Data continuation of application No. 14/691,091, filed on Apr. 20, 2015, now Pat. No. 9,694,914, which is a continuation of application No. 13/596,203, filed on Aug. 28, 2012, now Pat. No. 9,013,331, which is a continuation-in-part of application No. 13/423,483, filed on Mar. 19, 2012, now Pat. No. 9,010,969.

(60) Provisional application No. 61/453,944, filed on Mar. 17, 2011, provisional application No. 61/454,237, filed on Mar. 18, 2011, provisional application No. 61/511,872, filed on Jul. 26, 2011.

(51) Int. Cl.
*F21S 8/00* (2006.01)
*F21Y 115/10* (2016.01)
*F21W 111/06* (2006.01)

(52) U.S. Cl.
CPC ...... B64D 2203/00 (2013.01); F21W 2111/06 (2013.01); F21Y 2115/10 (2016.08); Y02T 50/82 (2013.01)

(58) Field of Classification Search
CPC .......... G08G 5/05; G08G 5/06; G08G 5/0013; G08G 5/0082; G08G 5/0086; B64D 2203/00; G01S 2013/93; G01S 13/913; G01S 13/916
USPC ............... 340/435, 945, 953, 961, 963, 972, 340/981–983; 342/29–30, 36–37, 387; 701/9, 14, 300–301
See application file for complete search history.

(56) References Cited

U.S. PATENT DOCUMENTS

| | | | |
|---|---|---|---|
| 5,155,666 A | 10/1992 | Radford et al. | |
| 5,608,290 A | 3/1997 | Hutchisson et al. | |
| 5,642,933 A | 7/1997 | Hitora | |
| 5,838,247 A | 11/1998 | Bladowski | |
| 5,929,788 A | 7/1999 | Vukosic | |
| 6,022,124 A | 2/2000 | Bourn et al. | |
| 6,070,994 A | 6/2000 | Sebek et al. | |
| 6,183,100 B1 | 2/2001 | Suckow | |
| 6,364,506 B1 | 4/2002 | Gallo | |
| 6,379,026 B1 | 4/2002 | Petrick | |
| 6,464,373 B1 | 10/2002 | Petrick | |
| 6,525,668 B1 | 2/2003 | Petrick | |
| 6,561,689 B1 | 5/2003 | Kidd et al. | |
| 6,601,970 B2 | 8/2003 | Ueda et al. | |
| 6,637,921 B2 | 10/2003 | Coushaine | |
| 6,679,618 B1 | 1/2004 | Suckow et al. | |
| 6,690,296 B2 | 2/2004 | Corwin et al. | |
| 6,705,745 B1 | 3/2004 | Pederson | |
| 6,793,372 B2 | 9/2004 | Wehner et al. | |
| 6,932,496 B2 | 8/2005 | Rizkin et al. | |
| 6,948,830 B1 | 9/2005 | Petrick | |
| 6,991,351 B1 | 1/2006 | Petrick | |
| 7,040,782 B2 | 5/2006 | Mayer | |
| 7,079,041 B2 | 7/2006 | Fredericks et al. | |
| 7,160,004 B2 | 1/2007 | Peck | |
| 7,163,322 B2 | 1/2007 | Tatewaki et al. | |
| 7,236,105 B2 | 6/2007 | Brenner et al. | |
| 7,237,929 B2 | 7/2007 | Stahl | |
| 7,385,527 B1 | 6/2008 | Clavier et al. | |
| 7,497,593 B2 | 3/2009 | Wang | |
| 7,568,821 B2 | 8/2009 | Peck et al. | |
| 7,578,600 B2 | 8/2009 | Czajkowski | |
| 7,604,384 B2 | 10/2009 | Peck | |
| 7,658,513 B2 | 2/2010 | Peck | |
| RE41,153 E | 3/2010 | Mork et al. | |
| 7,737,867 B2* | 6/2010 | Arthur .................. | G01O 23/00 340/909 |
| 7,758,210 B2 | 7/2010 | Peck | |
| 7,783,427 B1 | 8/2010 | Woodell et al. | |
| 7,786,922 B2* | 8/2010 | Stayton ................. | G01S 13/782 342/30 |
| 7,791,497 B2 | 9/2010 | Clerk | |
| 7,804,981 B2 | 9/2010 | Viggiano et al. | |
| 7,832,908 B2 | 11/2010 | Peck et al. | |
| 7,868,812 B2 | 1/2011 | Huthoefer et al. | |
| 7,908,079 B1 | 3/2011 | Dabney et al. | |
| RE42,708 E | 9/2011 | Mark et al. | |
| 8,033,683 B2 | 10/2011 | Fields | |
| 8,049,644 B1 | 11/2011 | Oehlert et al. | |
| 8,096,677 B2 | 1/2012 | Fields et al. | |
| 8,591,073 B2 | 11/2013 | Peck et al. | |
| 8,965,671 B2 | 2/2015 | Choksi | |
| 9,010,969 B2 | 4/2015 | Roudeski | |
| 9,016,896 B1 | 4/2015 | Roudeski | |
| 2001/0015899 A1 | 8/2001 | Kondo et al. | |
| 2004/0004836 A1 | 1/2004 | Dubuc | |
| 2004/0057234 A1 | 3/2004 | Mohacsi | |
| 2004/0057244 A1 | 3/2004 | Amano | |
| 2004/0145910 A1 | 7/2004 | Lisowski | |
| 2004/0196646 A1 | 10/2004 | Machi et al. | |
| 2005/0015202 A1 | 1/2005 | Poe et al. | |
| 2005/0094393 A1 | 5/2005 | Czajkowski | |
| 2005/0157490 A1 | 7/2005 | Klose | |
| 2006/0007012 A1 | 1/2006 | Machi et al. | |
| 2006/0012990 A1 | 1/2006 | Walser et al. | |
| 2006/0291209 A1 | 12/2006 | Booth et al. | |
| 2008/0192480 A1 | 8/2008 | Rizkin et al. | |
| 2008/0306691 A1 | 12/2008 | Louis et al. | |
| 2009/0115637 A1 | 5/2009 | Naimer et al. | |
| 2009/0201190 A1 | 8/2009 | Huthoefer et al. | |
| 2009/0219715 A1 | 9/2009 | Peck et al. | |
| 2010/0017127 A1 | 1/2010 | Pepitone | |
| 2010/0027281 A1 | 2/2010 | Waters et al. | |
| 2010/0052973 A1 | 3/2010 | Fabre et al. | |
| 2010/0070180 A1 | 3/2010 | Ridenour | |
| 2010/0084979 A1 | 4/2010 | Burton et al. | |
| 2010/0121575 A1 | 5/2010 | Aldridge et al. | |
| 2010/0194603 A1 | 8/2010 | Wobben | |
| 2010/0244748 A1 | 9/2010 | Haab et al. | |
| 2010/0253546 A1 | 10/2010 | Ibrahim et al. | |
| 2010/0259929 A1 | 10/2010 | Henri et al. | |
| 2011/0051421 A1 | 3/2011 | Chew | |
| 2011/0058370 A1 | 3/2011 | Datz et al. | |
| 2011/0121734 A1 | 5/2011 | Pape | |
| 2011/0163908 A1* | 7/2011 | Andersson ............ | G01S 5/0072 342/36 |
| 2011/0194283 A1 | 8/2011 | Roer | |
| 2011/0235322 A1 | 9/2011 | Fields et al. | |
| 2011/0241926 A1 | 10/2011 | Laufer | |
| 2011/0305014 A1 | 12/2011 | Peck | |
| 2012/0300449 A1 | 11/2012 | Fields | |
| 2014/0036502 A1 | 2/2014 | Peck et al. | |

FOREIGN PATENT DOCUMENTS

| | | | |
|---|---|---|---|
| EP | 1698823 B1 | 4/2010 | |
| EP | 2199206 A1 | 6/2010 | |
| JP | 2001243821 A | 9/2001 | |
| WO | 2009084049 A1 | 7/2009 | |
| WO | 2009090185 A2 | 7/2009 | |
| WO | 2009133326 A2 | 11/2009 | |
| WO | 2012039776 A1 | 3/2012 | |

OTHER PUBLICATIONS

European Search Report, Application EP12160211, dated Aug. 7, 2013.
Urgent Communications, View From the Top Blog, "A New Development in Tower-Aviation Safety", pp. 1-3, Mar. 7, 2013, http://urgentcomm.com/blog/new-development-tower-aviation-safety.
Federal Communications Commission, FCC 13-30 Report and Order, promoting aviation safety, Mar. 1, 2013.
ADS-B Technologies, Product menu, "Mobile & Tactical ADS-B Systems", Nov. 29, 2011, http://www.ads-b.com/LISTgallery3.htm.

(56) References Cited

OTHER PUBLICATIONS

Patriot Technologies, LLC, Lori Huthoefer, Power Point Presentation, "The Runway Occupancy Warning System (ROWS)", Jul. 18, 2011, www.patriot-technologies.com.

Citation Excel, Informational Flyer, "Runway Status Lights", Jun. 11, 2011, www.ce560xl.com/files/RWSL.pdf.

Jeppesen, Jepp View 3.6.3.1, Informational Flyer, "Pilot Guide to Runway Status Lights (RWSL) Logan International Airport (BOS)", Jun. 30, 2010.

Roger-Wilco, Life Around Runways by Steve, "New Tools in the Arsenal to Prevent Runway Incursions—RWSL and FAROS", Mar. 16, 2010, www.roger-wilco.net.

Lincoln Laboratory Journal, James R. Eggert, Bradley R. Howes, Maria Picardi Kuffner, Harald Wilhelmsen, and D. Jonathan Bernays, "Operational Evaluation of Runway Status Lights", pp. 123-146, vol. 16, No. 1, 2006.

NASA, J. Timmerman, Rockwell Collins, CR-2001-211242 Report, "Runway Incursion Prevention System ADS-B and DGPS Data Link Analysis Dallas—Ft. Worth International Airport", Nov. 2001, Cedar Rapids, Iowa.

Dialight Corp., Product datasheet for D164 Series LED Red Beacon, printed Jan. 21, 2011.

Avionics Today Article, NAV Canada Extends ADS-B Coverage, Mar. 30, 2012, www.aviationtoday.com/av/commercial/NAV-Canada-Extends-ADS-B-Coverage_76059.html#Umkns1M1nfs.

Promotional Sheet, Excelitas Technologies "Lighting Solutions for Safety and Security", 4 pages, 2011.

Data Sheet, Orga Model AOL1000SA High Intensity Aeronautical Obstruction Light, 2007.

\* cited by examiner

LIGHTING AND COLLISION ALERTING SYSTEM

CROSS-REFERENCE TO RELATED APPLICATIONS

This application is a continuation of U.S. patent application Ser. No. 15/641,290, filed Jul. 4, 2017, now U.S. Pat. No. 10,124,910, which is a continuation of U.S. patent application Ser. No. 14/691,091, filed Apr. 20, 2015, now U.S. Pat. No. 9,694,914, which is a continuation of U.S. patent application Ser. No. 13/596,203, filed Aug. 28, 2012, now U.S. Pat. No. 9,013,331, which is a continuation-in-part of U.S. patent application Ser. No. 13/423,483, filed Mar. 19, 2012, now U.S. Pat. No. 9,010,969, which claims priority to U.S. provisional application No. 61/453,944, filed Mar. 17, 2011, U.S. provisional application No. 61/454,237, filed Mar. 18, 2011, and U.S. provisional application No. 61/511,872, filed Jul. 26, 2011. The entire contents of each of these applications are expressly incorporated herein by reference thereto.

FIELD

The present invention relates generally to lighting systems, in particular to obstruction lighting systems utilizing light emitting diodes. The present invention further relates to collision alerting systems usable in conjunction with, among other things, the aforementioned lighting systems.

BACKGROUND

The Federal Aviation Administration (FAA) requires that obstructions to aircraft navigation, such as towers, cables and tall buildings be fitted with visibly perceivable elements to render these structures highly visible to approaching aircraft. FAA Advisory Circular 150/5345-43 forms a specification of technical requirements for these lights in the United States. Within Advisory Circular 150/5345-43 there exists a requirement for a medium-intensity flashing red obstruction light system, designated the "L-864" and a medium-intensity flashing white obstruction light, designated the "L-865." These obstruction lights are to be placed in accordance with a set plan at levels on all obstructions that are potential hazards to air navigation.

For the L-864 obstruction light, at all radials throughout a 360 degree azimuth, there must be a peak effective intensity of 2,000±25 percent candela. There must also be a minimum effective intensity of 750 candela throughout a minimum vertical beam spread of 3 degrees. For the L-865 obstruction light, at all radials throughout a 360 degree azimuth, there must be a peak effective intensity of 20,000±25 percent candela during operation at day and twilight conditions, and 2,000±25 percent candela during night conditions. The L-865 obstruction light also includes a minimum vertical beam spread of 3 degrees.

A drawback of these obstruction lights is that they typically utilize incandescent lamps, which have a relatively limited service life. Consequently, the incandescent lamps require frequent replacement. Since the obstruction lights are mounted atop tall structures, replacing these lamps can be inconvenient, time-consuming, expensive and even dangerous. Utilizing light emitting diodes (LEDs) as a light source in obstruction lights overcomes many of these drawbacks. However, LEDs present new design challenges.

Another drawback of conventional obstruction lights is light pollution. Light pollution as it relates to obstruction lighting may be generally defined as the emission of light outside the band specified by Advisory Circular 150/5345-43. Light pollution can be an annoyance, particularly when the obstruction light is proximate to residential areas. In some cases light pollution can cause problems such as sleep deprivation or the blocking of an evening view.

In an optical system for an obstruction light, one approach for arranging LED light sources is to orient them vertically, aimed outwardly from the light assembly. However, shaping multiple light sources into a tight continuous horizontal beam requires a lens, which is less efficient than a reflector. Additionally, the LED junctions thusly configured are more vulnerable to damage due to lightning effects.

Another approach is to mount the LEDs so they are oriented horizontally and aimed upwardly, using a reflector to shape and redirect the light outwardly. In this configuration the reflector is very efficient and also acts as a lightning mediator. Another advantage of this arrangement is that it minimizes direct-light emissions from the LEDs shining downwardly from the obstruction light, which may be considered a neighborhood annoyance.

Orienting LEDs so that they are aimed downwardly is also desirable since it offers more efficient cooling of the LEDs and makes servicing of the LEDs more convenient. However, this arrangement is problematic because it inherently directs some of the LED light toward the neighborhood below the obstruction light.

Moreover, horizontally orienting LEDs and aiming them toward a reflector is undesirable, as this directs the brightest part of the LED beam toward the flatter area of the reflector, thereby reducing beam focus.

In addition to obstruction lights, strobe lights and beacons (hereafter collectively and generally termed "anti-collision lights") are attached to vehicles, and to obstructions such as buildings and communication towers. Anti-collision lights are designed to warn vehicle operators of hazards to navigation, typically by periodically illuminating the light in a repetitive, attention-getting on-and-off pattern.

Current ground-based anti-collision technology typically comprises high-intensity lights that may be configured to flash at predetermined colors, frequencies, and intensities. Their design is intended to provide a visually perceivable alert to deter potential collisions. These lights have proven effective over time, but they have not significantly changed in almost eight decades. While anti-collision lights have increased in intensity and visibility, become more reliable and energy efficient, and have developed the ability to report their operating condition (i.e., faults) and status, they have not evolved beyond simply flashing or blinking a light at a regular interval to provide a simple warning. Since the light has no active role in collision avoidance, it is incumbent upon the operator of a vehicle in the vicinity of the light to see it, recognize it, and react appropriately to avoid a collision.

As population densities increase, the current anti-collision technology is being stressed. The increasing population density creates three challenges for the existing state-of-the-art flashing anti-collision light. Firstly, there is more traffic and population in a given geographic region, which increases the potential for a collision. Secondly, more people require more infrastructure, which results in more man-made obstacles being erected with which to collide. Finally, current technology is increasingly becoming more dependent upon wireless resources, resulting in an ever-increasing number of transmitting and receiving towers that may become hazards to navigation. Growing populations, expanding infrastructure requirements, and evolving wireless technologies are all resulting in a significant increase in the potential for dangerous collisions while anti-collision technology has effectively remained stagnant.

Furthermore, renewable-energy systems such as wind turbines are becoming increasingly common. These systems, owing to their size, often present potential hazards to air navigation.

SUMMARY

An obstruction light utilizing LEDs as a light source is disclosed according to an embodiment of the present invention. The LEDs are oriented and aimed toward a reflector so as to minimize downwardly-directed light while also enhancing the characteristics of the desired light output from the reflector.

One object of the present invention is a lighting system comprising a reflector having a plurality of reflecting surfaces. The plurality of reflecting surfaces have at least one optical axis, and the reflecting surfaces further include a linearly projected cross-section along a respective linear axis. In one embodiment, the linearly projected cross-section of the reflecting surfaces comprise a substantially conic shape. A plurality of light emitting diodes (LEDs) are positioned in a line generally parallel to the linearly projected cross-section of the plurality of reflecting surfaces. The LEDs are oriented relative to an associated reflecting surface such that a central light-emitting axis of the plurality of LEDs is angled relative to the at least one optical axis of the associated reflecting surface at about 45°. The reflecting surfaces redirect and collimate a light output of the plurality of LEDs at an angle of about 45° with respect to the central light emitting axis of the plurality of LEDs.

In one embodiment the present invention detects and tracks vehicles in close proximity to a predetermined obstacle having a known location. In the event of a detected potential collision threat the present invention reacts by directly alerting the vehicle in any suitable manner such as, but not limited to, radio communications, aural signals and visually perceivable signals such as a light having alterable operating characteristics. So alerted, the operator of the vehicle can change course, as needed, to avoid the collision.

In another embodiment of the present invention a collision avoidance system includes a sensor that is configured to detect at least one vehicle in the vicinity of a predetermined area and generate target data relating to the at least one vehicles. The system further includes an awareness engine that is configured to receive the target data from the sensor and evaluate the target data for a threat of a collision. An alerting system issues an alert to the at least one vehicle in the event of a threat of a collision, the alerting system being activated by the awareness engine.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
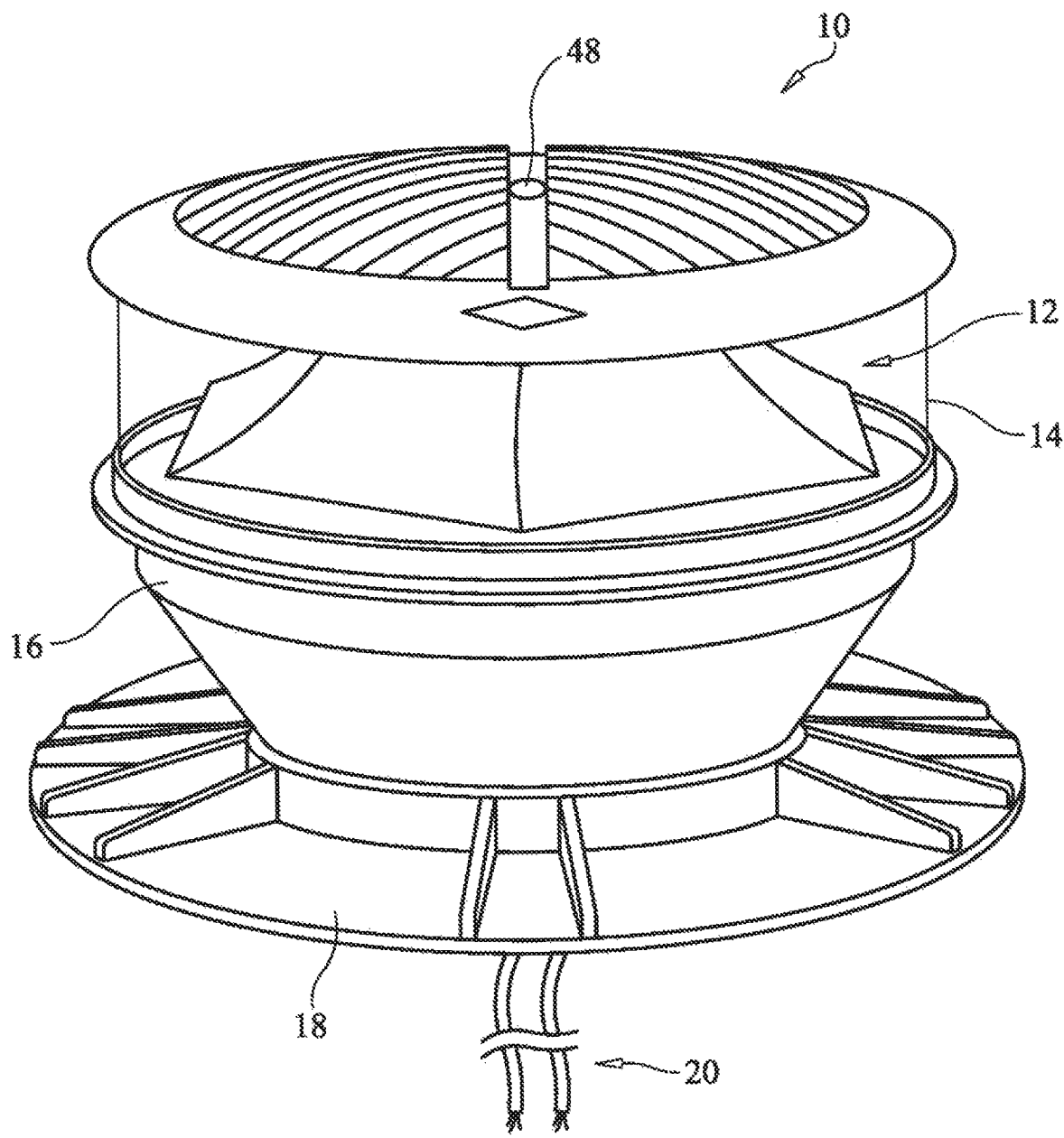
FIG. 1 is a perspective view of an obstruction light according to embodiment of the present invention.

The general arrangement of a lighting system 10 usable as an obstruction light, among other purposes, is shown in FIG. 1 according to an embodiment of the present invention. Lighting system 10 comprises an optic 12, a lens 14, a housing 16, a mounting base 18, an electrical connection 20 to the lighting system, and circuitry (not shown) to drive the lighting system. In one embodiment, a drive circuit (not shown) is disposed within a housing 16 and is capable of strobing optic 12 at one or more predetermined flash rates. Housing 16 supports optic 12, which is coupled thereto, and mounting base 18 provides a means for attaching lighting system 10 to a structure.

Figure 2:
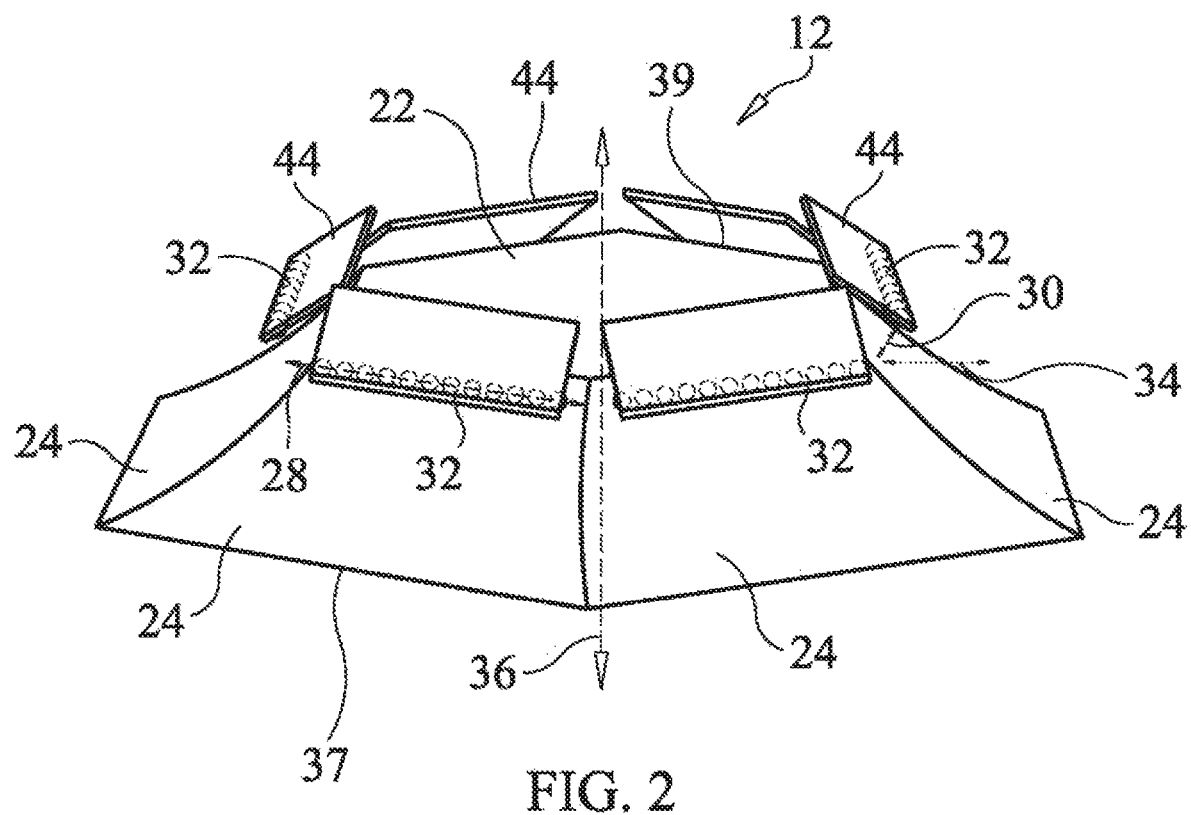
FIG. 2 is a perspective view of an embodiment of an optic of the obstruction light shown in FIG. 1.

FIG. 2 is a perspective view showing details of optic 12 according to an embodiment of the present invention. Optic 12 comprises a reflector 22 having a plurality of reflecting surfaces 24 that form a segmented-type reflector. Reflector 22 may be any type of optical reflector suitable for use with obstruction light 10. For example, reflector 22 may be, without limitation, in the form of a half-parabolic reflector.

Figure 3:
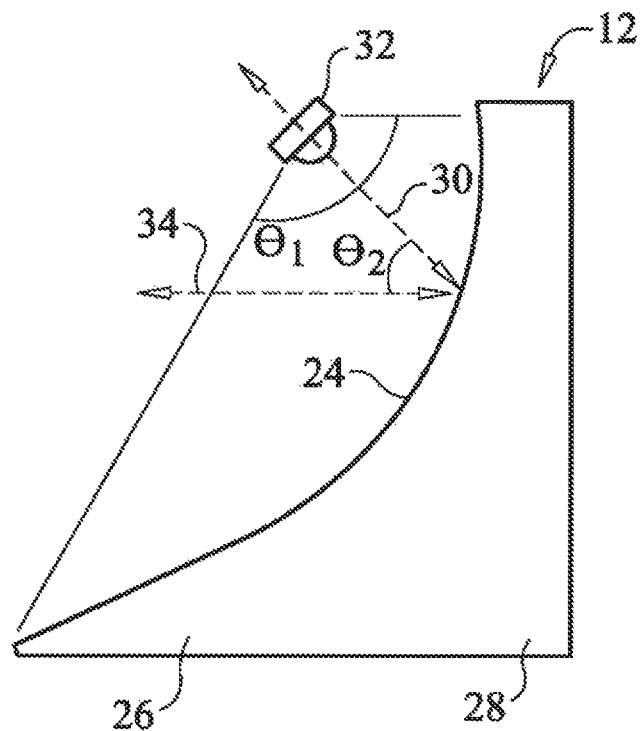
FIG. 3 is a partial sectional side view of an embodiment of the optic shown in FIG. 2.

With continued reference to FIG. 2, FIG. 3 depicts a partial sectional side view of optic 12. Each reflecting surface 24 comprises a cross-section 26, projected along an associated linear axis 28. As can be seen, reflecting surface 24 has a generally conic cross-section, and a central light-emitting axis 30 of a light emitting diode (LED) 32 is in the same plane as the cross-section. FIG. 3 also shows an angle $\theta_1$ over which light emitted from LED 32 is reflected by reflecting surface 24. In one embodiment, the linearly projected cross-section 26 comprises a conic section. In other embodiments cross-section 26 of reflecting surface 24 comprises at least one of a conic or a substantially conic shape. In various embodiments the conic shape comprises at least one of a hyperbola, a parabola, an ellipse, a circle, or a modified conic shape.

In some embodiments of the present invention reflecting surface 24 is neither concave or convex along linear axis 28. In other embodiments reflecting surface 24 may be concave along linear axis 28. In still other embodiments reflecting surface 24 may be convex along linear axis 28.

Each reflecting surface 24 has an associated optical axis 34. In one embodiment, each reflecting surface 24 reflects a beam of light having an angular distribution that is horizontally symmetric to the associated optical axis 34, i.e., symmetric about the associated optical axis in directions along linear axis 28.

Reflector 22 may be made from any suitable material including, without limitation, metal or a reflective material. Non-limiting examples of materials for reflector 22 include highly-polished metal, a coated (i.e., "metalized") metal or non-metal substrate, and a reflective film applied to a metal or non-metal substrate.

For each reflecting surface 24, optic 12 comprises at least one associated LED 32. LED 32 typically emits light in a hemisphere centered and concentrated about central light-emitting axis 30. LED 32 is positioned relative to the associated reflecting surface 24 such that central light-emitting axis 30 of the LED is angled at a predetermined angle $\theta_2$ relative to the optical axis 34 associated with the reflecting surface 24. In a preferred embodiment, $\theta_2$ has a value of about 45°. In some embodiments of the present invention, the about 45° value has a tolerance of ±15°, i.e., from 30° to 60°.

Figure 4:
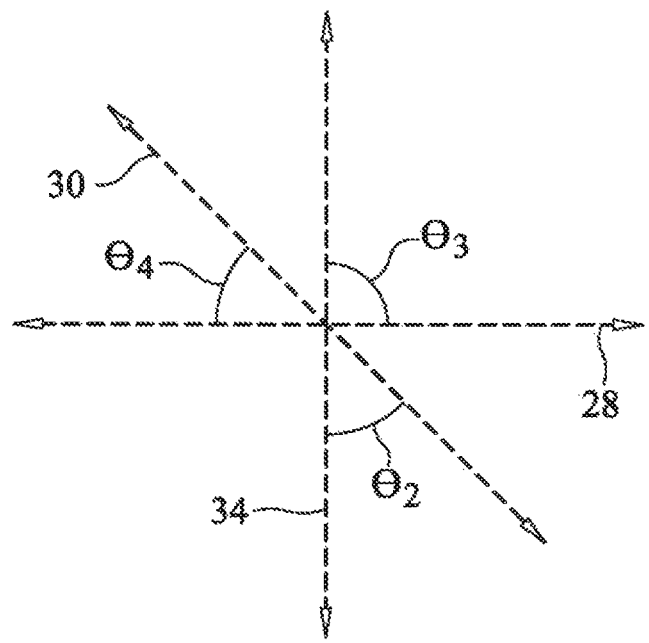
FIG. 4 shows the angular relationship between an optical axis associated with a reflecting surface of the optic of FIG. 2, a central light emitting axis of an LED of the optic, and a linear axis of the reflecting surface.

With reference now to FIG. 4 in combination with FIGS. 2 and 3, in one embodiment of the present invention, for a specific reflecting surface 24 and associated LED 32, the central light-emitting axis 30 of the LED, the optical axis 34 associated with the reflecting surface, and the linear axis 28 of the reflecting surface form axes of a 3-axis linear coordinate system. $\theta_2$ is the angle between central light-emitting axis 30 and optical axis 34. $\theta_3$ is the angle between optical axis 34 and linear axis 28. $\theta_4$ is the angle between the central light emitting axis 30 and the linear axis 28. In one embodiment, the relationship between central light-emitting axis 30, optical axis 34 and linear axis 28 is approximate. For example, each of central light-emitting axis 30, optical axis 34, and linear axis 28 can be angled at 45° from each of the other two axes, with a tolerance, in some embodiments, of ±15°.

As shown in FIG. 2, for each reflecting surface 24, optic 12 includes a plurality of associated LEDs 32. In one embodiment, the plurality of associated LEDs 32 are arranged along a line, generally parallel to linear axis 28 of reflecting surface 24. In other embodiments of the present invention the plurality of associated LEDs 32 may be generally staggered about a predetermined line. For example, in one embodiment, the plurality of associated LEDs 32 are staggered about a line, with the staggering comprising offsetting the LEDs from the line by a predetermined distance in alternating directions perpendicular to the line. As will be detailed further below, in some embodiments of the present invention LED 32 (or a plurality of LEDs) are positioned at a focal distance of reflecting surface 24.

Figure 5:
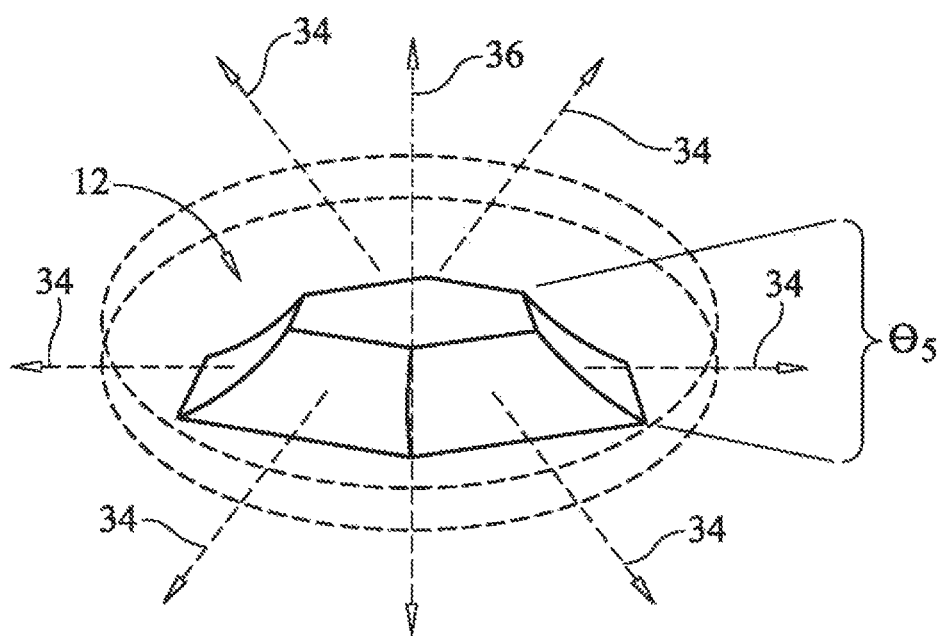
FIG. 5 describes optical characteristics of the optic of FIG. 2.

FIG. 5 depicts a partial perspective view of an embodiment of lighting system 10 in which the lighting system emits light outward over a 360° angular distribution about a central axis 36 of the reflector 22 of optic 12. Such a 360° angular distribution of reflected light may be a requirement for lighting system 10 to provide obstruction warning in all directions. The light emitted from the beacon light 20 has a predetermined beam spread $\theta_5$. The beam spread $\theta_5$ is the angle, vertically perpendicular to the optical axes 34 of the reflecting surfaces 24, over which the intensity of the emitted light is greater than 50% of the peak intensity of the emitted light. In a preferred embodiment, lighting system 10 has a beam spread $\theta_5$ of less than 3°. In another embodiment, lighting system 10 has a beam spread $\theta_5$ of less than 10°.

Figure 6:
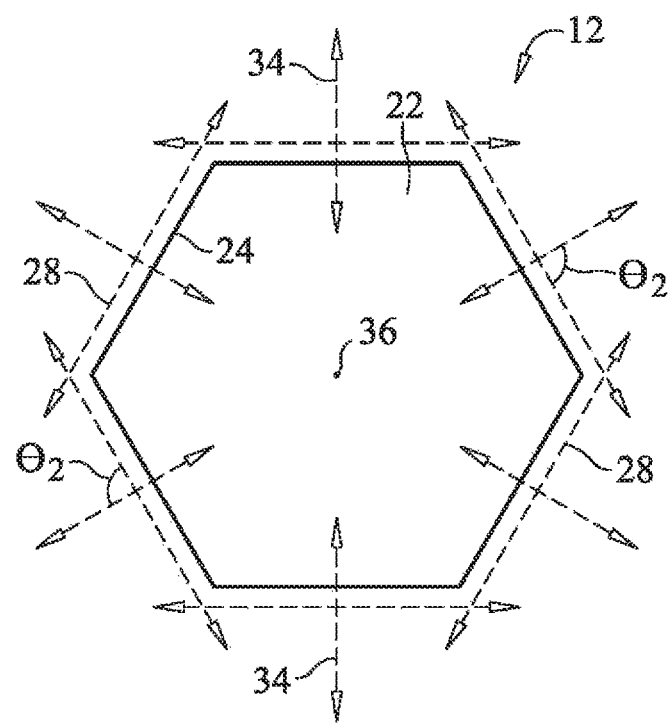
FIG. 6 is a sectional top view of a reflector of the optic of FIG. 2.

Referring again to FIGS. 2 and 3, the plurality of reflecting surfaces 24 of reflector 22 are arranged such that each of the associated linear axes 28 is angled relative to the linear axis of another reflecting surface. In one embodiment, the plurality of linear axes 28 occupy a single plane and intersect each other to outline a polygon. In other words, a top-view cross-section of reflector 22 may have a perimeter which is polygonal in shape. FIG. 6 depicts a sectional top view of an embodiment of reflector 22, showing the plurality of associated linear axes 28 intersecting each other to form a hexagon. This embodiment of reflector 22 achieves the aforementioned 360° angular distribution, relative to the central axis 36 of reflector 22, of light emitted from optic 12. Each reflecting surface 24 preferably reflects light in the direction of the optical axis 34 associated with that reflecting surface, and through an angular distribution horizontally symmetric to and centered to the optical axis.

Although FIG. 6 depicts a polygon embodiment of reflector 22 having six reflecting surfaces 24 it will be understood that the reflector may have greater or fewer reflecting surfaces within the scope of the invention. In addition, the intersection of the plurality of linear axes 28 need not outline a polygon. Furthermore, light emitted from optic 12 need not have a 360° angular distribution relative to the central axis 36 of reflector 22. Such an embodiment may instead have, for example, a 180° angular distribution.

In some embodiments of the present invention the plurality of reflecting surfaces 24 of reflector 22 may be connected together. Accordingly, reflecting surfaces 24 may be made as separate pieces and joined together. Alternatively, reflecting surfaces 24 may be formed as a unitary piece.

Figure 7:
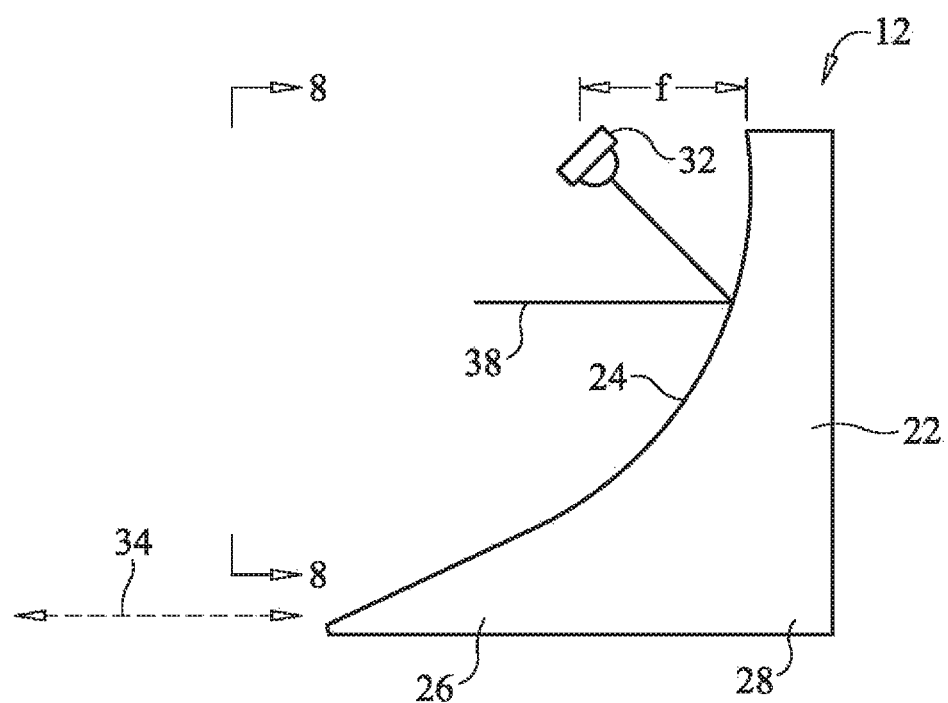
FIG. 7 is a partial side view of the optic of FIG. 2, showing simulated light ray traces.

FIG. 7 shows a partial side view of an embodiment of optic 12. LED 32 is located at a focal distance "f" of reflecting surface 24. FIG. 7 also shows simulated ray traces 38 showing the path of light traveling from LED 32 to reflecting surface 24 and outward from reflector 22. As can be seen, ray traces 38 are generally parallel to optical axis 34 of optic 12.

Figure 8:
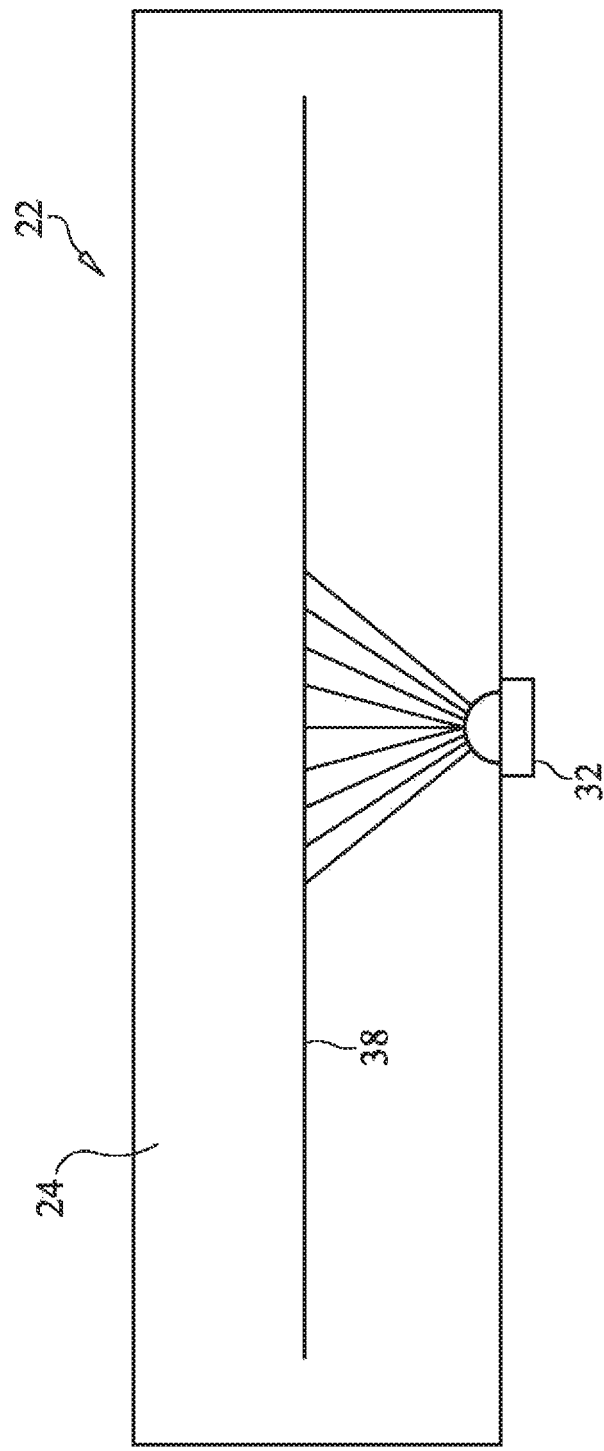
FIG. 8 is a partial front view of the optic of FIG. 7, showing the same light ray traces from another view.

FIG. 8 shows a partial frontal view of the optic 12 of FIG. 7, showing the same simulated ray traces 38 as FIG. 7. Because reflecting surface 24 of FIGS. 7 and 8 is a projection of the cross-section 26 along the linear axis 28, light traveling from LED 32 to the reflecting surface results in collimated light that is reflected generally parallel to the optical axis 34 of reflecting surface 24.

Figure 9:
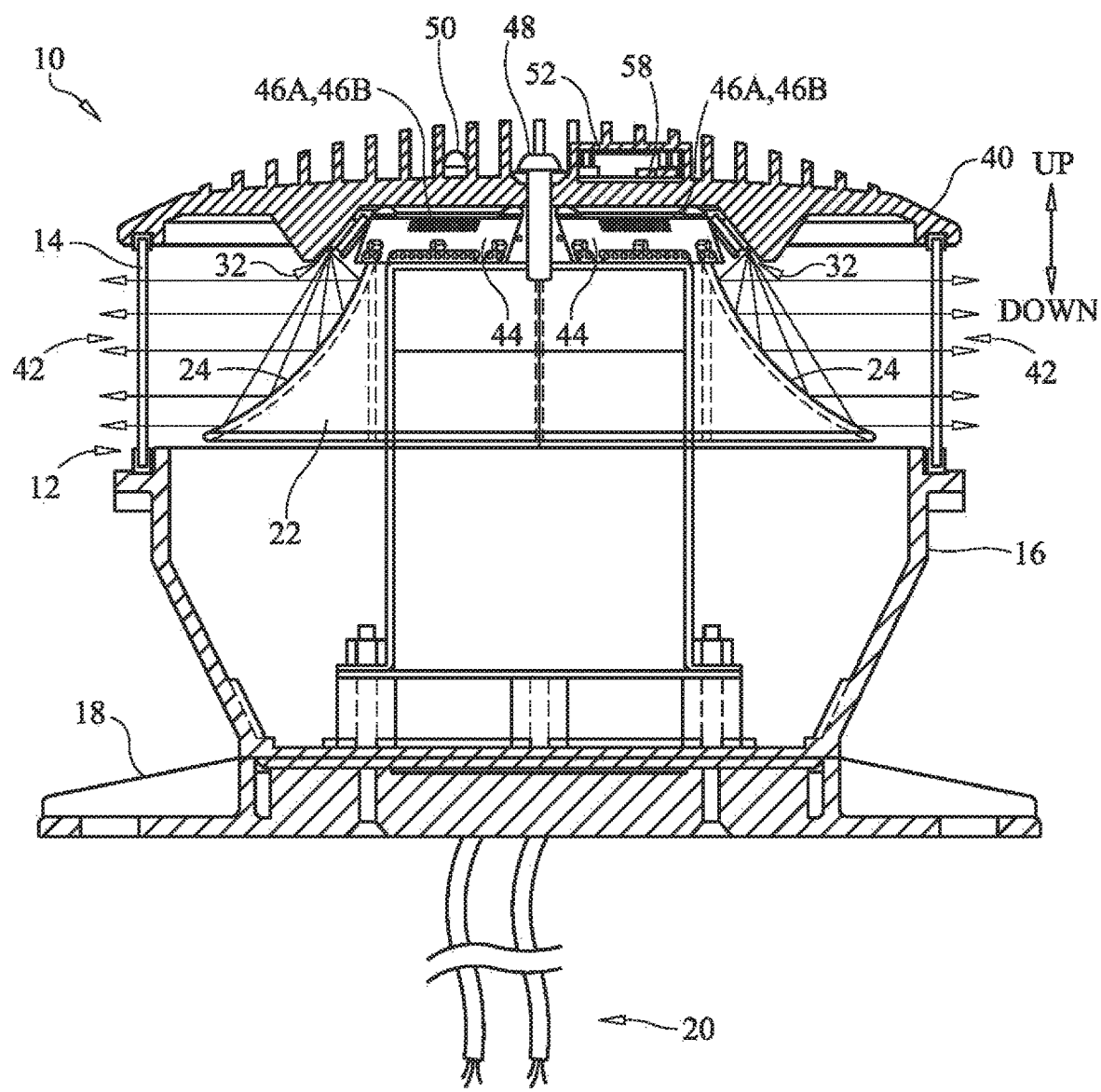
FIG. 9 is a view in section of the obstruction light of FIG. 1.

A view in section of lighting system 10 is shown in FIG. 9 according to an example embodiment of the present invention. Reflector 22 is oriented such that a base portion 37 (FIG. 2) of the reflector is directed downwardly, while an opposing, smaller top portion 39 is directed upwardly. A plurality of LEDs 32 are oriented downwardly at an inward angle, and are aimed toward complementary reflecting surfaces 24 of reflector 22. A heat sink 40 atop lens 14 provides both a mounting point and a cooling means for LEDs 32 and, optionally, any associated control or driver electronics (not shown). Lens 14 provides protection for LEDs 32 and reflector 22, shielding them from exposure to the elements. Mounting base 18 facilitates installation of lighting system 10 at a desired site.

LEDs 32 may be any type of light emitting diode suitable for use with lighting system 10. As a non-limiting example, LEDs 32 may be arranged in a linear or non-linear array (FIG. 2), and may be packed in groups or sub-groups having a predetermined number of LED elements. In one embodiment of the present invention LEDs 32 are oriented to extend downwardly from heat sink 40 and are aimed inwardly (i.e., generally toward central axis 36) at an angle of about 45 degrees as discussed above, though greater and lesser angles are anticipated within the scope of the invention.

By positioning LEDs 32 in the manner shown in FIG. 9 a beam of light 42 emitted by the LEDs is directed toward a focusing area of reflector 22, so the beam is relatively tightly focused. In addition, heat sink 40 substantially blocks undesired light emissions from LEDs 32 in an upwardly direction from lighting system 10, thereby limiting light pollution generated by the lighting system in the upward direction from the lighting system. Similarly, directly-emitted light from LEDs 32 is limited by reflector 22 and housing 16 to block light emitted by LEDs 32 from traveling in a downwardly direction from lighting system 10.

In some embodiments of the present invention LEDs 32 are mounted on detachable, insulated metal substrates 44 to form light source assemblies that easily plug into mating connectors situated in lighting system 10. Such non-leaded assemblies reduce the labor associated with replacing the LEDs and eliminate service problems associated with wire-lead breakage.

For example, substrates 44 may include a connector portion 46A that is configured to electrically and mechanically couple to a mating connector 46B mounted to heat sink 40. Connectors 46A, 46B are preferably selectably detachable. Thus, in the event that one or more substrates 44 are replaced, heat sink 40 may be detached from lighting system 10 by removing a fastener 48 from a threaded receptacle in housing 16 to expose substrates 44. The select substrates 44 are detached from their respective mating connectors 46B and replaced. Once the select substrate(s) 44 are replaced, heat sink 40 is placed onto lighting system 10 and fastener 48 is re-installed, securing the heat sink to the lighting system.

In some embodiments of the present invention lighting system 10 includes at least one auxiliary lighting assembly having one or more auxiliary LEDs 50, preferably configured to emit light upwardly from lighting system 10. In some embodiments auxiliary LED 50 may differ from LEDs 32. For example, auxiliary LED 50 may be configured to emit infrared light to alert flight crews operating with night vision imaging systems (NVIS).

A method of using optic 12 or lighting system 10 includes arranging a plurality of reflecting surfaces 24 relative to each other, the reflecting surfaces having a linearly-projected cross-section 28. The method also includes the step of positioning at least one LED 32 relative to at least one of the reflecting surfaces 24, the positioning step angling the central light-emitting axis 30 of the LED relative to the optical axis 34 associated with the reflecting surface 24 at about 45°. The method also comprises transmitting light from LED 32 to the reflecting surface 24. In one embodiment of the method, the about 45° has a tolerance of ±15°.

In one embodiment of the method, the at least one LED 32 comprises a plurality of LEDs, the at least one optical axis 34 comprises a plurality of optical axes, and the positioning step comprises positioning each of the plurality of LEDs relative to a respective one of the plurality of optical axes 34 at about 45°. In one embodiment of the method, each reflecting surface 24 comprises a cross-section projected along a linear axis 28, and the arranging step comprises arranging the plurality of reflecting surfaces 24 relative to each other so that a plurality of the linear axes are angled relative to each other.

Figure 10:
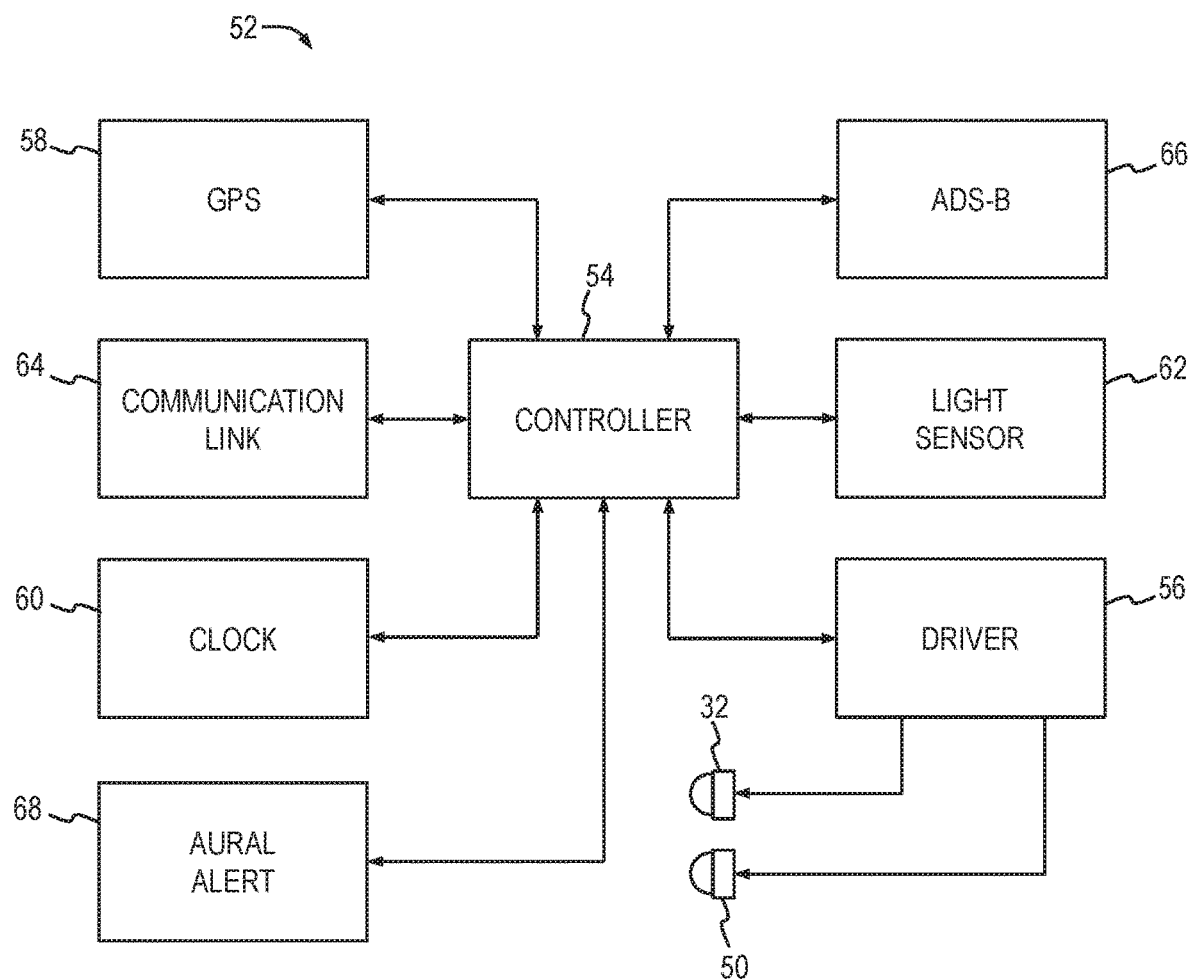
FIG. 10 is a schematic block diagram showing the general arrangement of a control system for an obstruction light according to an embodiment of the present invention.

With reference to FIG. 10, lighting system 10 may include a control system 52 that may be configured (or reconfigured) as desired to suit a particular installation. In some embodiments control system 52 includes a controller 54. Controller 54 may be a digital microprocessor-based control unit configured to receive input signals and process same according to control logic to control the operation of lighting system 10. Alternatively, controller 54 may comprise other digital architectures utilizing, for example, a computer, microcontroller, programmable logic device and the like. The control logic of controller 54 may be defined by a set of predetermined instructions, such as a computer program or "fuzzy logic." In other embodiments of the present invention portions of controller 54 may be analog, such as an analog open- or closed-loop control system. Controller 54 may be a separate, standalone component or made integral with (or distributed about) lighting system 10, such as housing 16 and heat sink 40.

A driver 56 of control system 52 controls the operation of LEDs 32, 50, controlling the voltage and/or current supplied to the LEDs, and detecting and compensating for faults within the LEDs. Driver 56 may also control the flash rate of LEDs 32, 50 in accordance with control signals provided by controller 54. Furthermore, when LEDs 32, 50 are to be turned off driver 56 may remove power supplied to the LED in accordance with control signals provided by controller 54.

Control system 52 may utilize a local or remote global positioning satellite (GPS) receiver 58, a clock 60, and so on to determine sundown and sunup to automatically turn lighting system 10 on and off accordingly and/or control the brightness of the output light via driver 56. In one embodiment of the present invention an ambient light sensor 62 may be utilized for this purpose, providing to controller 54 an electrical signal corresponding to the level of ambient light proximate lighting system 10. Ambient light sensor 62 may likewise be used as a control signal for control system 52 to dim the light output from LEDs 32 during periods of low-light, such as during inclement or overcast weather. Communication link 64 may also be connected to wired and wireless analog or digital networks including, without limitation, local area networks, wide area networks and the Internet.

Control system 52 may also include a one-way or two-way communication link 64 to facilitate remote control and monitoring of the status and operation of lighting system 10. Communication link 64 may include one or more of a radio frequency or light-based communication link.

In some embodiments of the present invention lighting system 10 may include an Automatic Dependent Surveillance-Broadcast (ADS-B) surveillance system 66 to detect aircraft equipped with ADS-B capability. ADS-B is an anti-collision technology being adopted by aircraft operators to provide airborne collision avoidance capability. ADS-B is the linchpin technology of the Federal Aviation Administration's (FAA's) current "NextGen air traffic management system." ADS-B is intended to enable the FAA to safely increase the density of air traffic while simultaneously reducing aircraft fuel consumption, allowing more dynamic and direct routing, improving anti-collision capability in aircraft, and enabling information exchange with airborne aircraft. At the core of the ADS-B system is a "heartbeat" that is transmitted by outfitted aircraft providing the aircraft's identification, location, velocity, and other relevant state data. Ground-based and airborne ADS-B receivers can receive this heartbeat and accurately determine an aircraft's position, direction, and velocity in a timely manner.

ADS-B system 66 may include sensing apparatus within or proximate to lighting system 10 to detect "targets," i.e., vehicles in the vicinity of a predetermined area, or an object or structure and then generate data relating to the targets. Alternatively, ADS-B system 66 may receive target data from sources remote from lighting system 10, either directly or via communication link 64. In various embodiments of the present invention ADS-B system 66 may utilize, without limitation, radar, sonar and proximity sensors to generate target data. ADS-B system 66 may also utilize information obtained on the Internet to generate target data. ADS-B system 66 may include or utilize any type of system, device or apparatus now known or later invented having a target detection capability. ADS-B system 66 is thus configured to detect at least one target vehicle.

With reference to FIGS. 9 and 10 together, in some embodiments of the present invention the illumination characteristics of lighting system 10 may be altered by control system 52 to correspond to the level of the threat of a collision. For example, light emitted by lighting system 10 may be increased in brightness and/or its flash rate may be increased as a target vehicle approaches an associated predetermined obstruction, then decreased in brightness and/or flash rate as the target moves away from the obstruction. Similarly, an aural alerting signal 68, such as a siren, may be actuated and may increase in frequency as a target vehicle approaches a predetermined obstruction, then decrease in frequency as the target vehicle moves away from the obstruction. Lighting system 10 may also be altered from a first color to a second color as a target vehicle approaches a predetermined obstruction, then restored to the first color as the target vehicle moves away from the obstruction. Finally, if the control system 52 detects a target vehicle within a predefined hazard envelope, which may be one or more predetermined areas and altitudes, the control system may broadcast over radio frequency, wired or wireless networks, the Internet, or any other suitable media (using, for example, communication link 64) a warning (such as, for example, an ADS-B compliant warning) to alert the target vehicle of a potential hazard.

Figure 11:
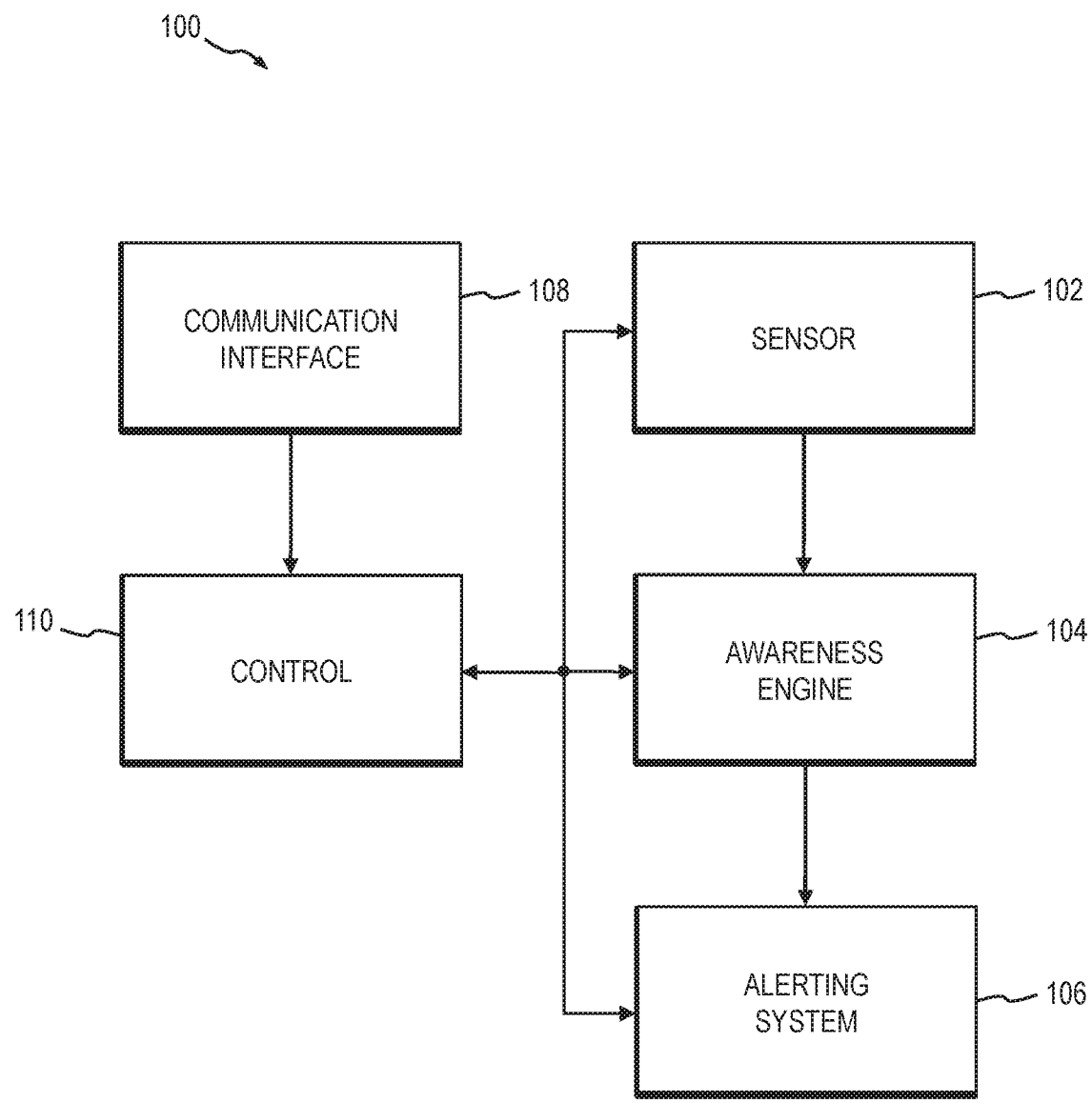
FIG. 11 is a schematic block diagram of a collision avoidance system according to an embodiment of the present invention.

Details of a collision avoidance system 100 are shown in FIG. 11 according to an embodiment of the present invention. System 100 includes a sensor 102 for detecting potential threats, an awareness engine 104 for evaluating detected potential threats, and an alerting system 106 to warn vehicles of obstacles. A communication interface 108 provides for information flow to and from system 100, and a control 110 controls the operation of the various elements of the system in a predetermined manner.

Sensor 102 provides the detection ability of collision avoidance system 100. Sensor 102 may include sensing apparatus within and/or proximate to system 100 to detect "targets," i.e., vehicles in the vicinity of a predetermined area, object or structure and then generate data relating to the targets. In one embodiment sensor 102 may include an Automatic Dependent Surveillance-Broadcast (ADS-B) surveillance system to detect aircraft equipped with ADS-B capability. Sensor 102 may also receive target vehicle information from sources remote from system 100, either directly or via communication interface 108 and generate target data at least in part from these sources. In various embodiments of the present invention sensor 102 may include or utilize any type of system, device or apparatus now known or later invented having a target detection capability. Examples include, without limitation, radar, sonar and proximity sensors. Sensor 102 may also utilize information obtained on networks such as the Internet to generate target data. Sensor 102 is preferably configured to detect at least one target vehicle in a predetermined area and to generate target data relating to the target vehicle (or vehicles). Target data generated by sensor 102 is provided to awareness engine 104.

In some embodiments of the present invention sensor 102 may comprise a plurality of target detection devices of the same or differing types in order to increase the fidelity of the detection capability of system 100. In such cases it may be preferable to configure sensor 102 to analyze and integrate the data from plural sensors into composite target data before providing the target data to awareness engine 104.

Figure 12:
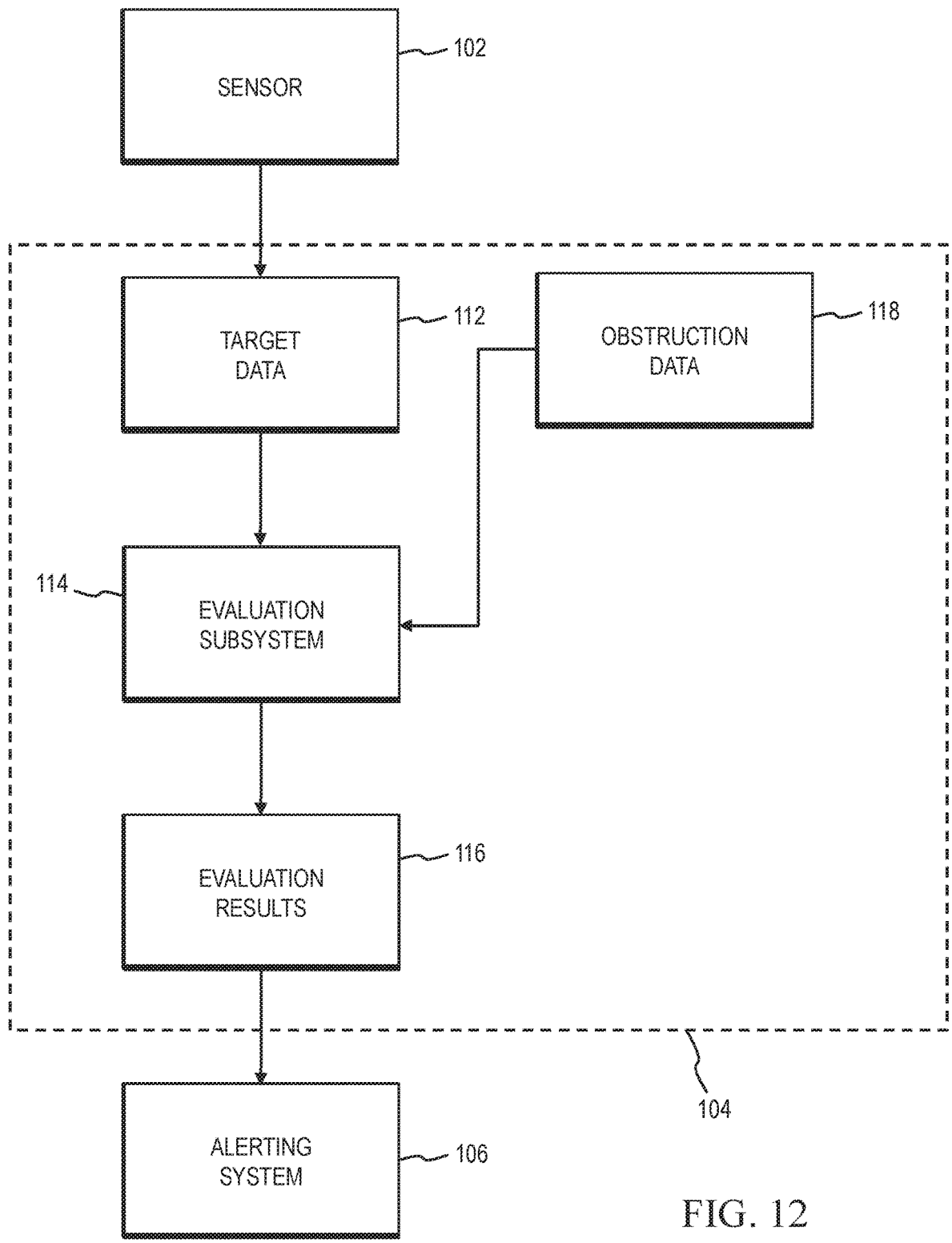
FIG. 12 is a schematic block diagram of an awareness engine portion of the collision avoidance system of FIG. 11.

Details of awareness engine 104 are shown in FIG. 12 according to an embodiment of the present invention. Target data 112 (which may represent one or a plurality of target vehicles) generated by sensor 102 is provided to an evaluation subsystem 114, which may comprise analog and/or digital control components and predetermined instructions similar to controller 54, detailed above.

In the case of a plurality of targets, evaluation subsystem 114 determines, from corresponding target data, the risk of a collision between two or more targets in the form of evaluation results 116 provided to alerting system 106. If the risk of the evaluation results exceeds a predetermined threshold, alerting system 106 is activated to issue a warning. Evaluation results 116 may, in addition to determining the risk level, provide ancillary data such as a graded level of risk (e.g., low, moderate, high), whether the risk of a collision is increasing or decreasing, and timing aspects of the risk (e.g., the rate at which the risk is increasing or decreasing, immanency of collision, etc.).

Similarly, evaluation subsystem 114 may compare target data relating to one or a plurality of targets with predetermined obstruction data 118 and provide evaluation results 116 in the manner detailed above.

Awareness engine 104 provides system 100 with the ability to interpret sensor 102 target data, determine if there is a threat of a collision and, if there is a potential threat, cause alerting system 106 to take a predetermined action. Awareness engine 104 receives target data 112 from sensor 102, evaluates the target data and determines if further action is required, and provides to alerting system 106 commands regarding what action is required. Awareness engine is preferably implemented utilizing relatively robust computing hardware and software, and in some embodiments may be an embedded system (i.e., a purpose-designed computing system and associated interfaces).

With reference again to FIG. 11, alerting system 106 is configured to perform the function of alerting a vehicle (or vehicles) of a potential collision risk. Alerting system 106 is preferably configured to receive commands from awareness engine 104 and to act in a timely manner based on the commands to avoid a collision. In one embodiment of the present invention alerting system 106 is an anti-collision light. In various embodiments alerting system 106 may include one or more of any devices and methods suitable for alerting vehicle operators of a potential collision. Examples include, without limitation, lights, sounds, and movement. Alerting system 106 may also alert vehicle operators by various electronic communications methods such as emails, short message service (SMS) alerts, injecting the collision information into the Internet for use by downstream services, and radio alerts.

In some embodiments of the present invention the characteristics of alerting system 106 may be adjusted to correspond to the level of the threat of a collision. For example, an anti-collision light of the alerting system (and/or lighting system 10) may be regularly increased in brightness and/or flash rate as a target vehicle approaches an associated predetermined obstruction, then decreased as the target vehicle moves away from the obstruction. Similarly, an aural signal, such as a siren, may be increased in frequency as a target vehicle approaches a predetermined obstruction, then decreased as the target vehicle moves away from the obstruction. Lighting system 10 and/or other light emitting devices may also be altered from a first color to a second color as a target vehicle approaches a predetermined obstruction, then restored to the first color as the target vehicle moves away from the obstruction.

Communication interface 108 facilitates communications to and, in some cases, from system 100. The communications may include receiving data from sources external to system 100 including, but not limited to, data relating to targets, control signals, commands, fault corrections, and instruction or program updates to control 110. The external sources may include, but are not limited to, computing devices, wired and wireless networks, proprietary information-collecting devices, the Internet, radio receivers, and so on. Such external sources may be located near system 100, or may be remote from the system and coupled to the system by any communication means now known or later invented. Communication interface 108 may also be configured to transmit external to system 100 status information relating to the system, including fault information. Communication interface 108 may be variously configured to receive and/or transmit analog signals as well as digital data, and may be configured to communicate using any data protocol or standard now known or later developed.

Control 110 is configured (or configurable) to control the operation of the components of system 100 in a predetermined manner to achieve the desired result of collision avoidance. Control 110 may be configured with analog and/or digital components, such as any type of computing device now known or later developed. Example computing devices include, without limitation, digital and/or analog computers, processors, microprocessors and microcontrollers. Control 110 may further include a predetermined set of instructions, generally termed "software," to configure the operation of control 110 and, in turn, system 100. Control 110 may also include a memory portion to store said software and, in some cases, data such as computations, historical logs, records, target vehicle information, and so on. It will be understood that control 110 may be a discrete subsystem as shown in FIG. 11, or may be distributed among some or all of sensor 102, awareness engine 104, alerting system 106 and communication interface 108. In still other embodiments system 100 may include both a discrete control subsystem 110 and distributed control elements, the control subsystem and distributed control elements working either independently or in concert with one another.

In some embodiments of the present invention sensor 102, awareness engine 104, alerting system 106, communication interface 108 and control 110 may be modularized and interconnected with standard or proprietary interfaces. In this manner, system 100 may be easily modified or upgraded by replacing individual modules with improved or modified modules. For example, a particular system 100 may be altered from utilizing an alerting system 106 having a high-intensity light as an anti-collision device to an alerting system having an aural anti-collision device with a simple exchange of the modularized alerting system subcomponent portions.

In addition, system 100 may be configured to be extensible so that, if more than type of alerting system 106 is desired the system can be upgraded to include multiple devices while maintaining the same sensor and potentially the same awareness engine 104. Similarly, system 100 may be configured to accommodate a plurality of sensors 102 and/or types of sensors to detect targets.

As an example of the operation of system 100, sensor 102 may include an ADS-B surveillance system. ADS-B data relating to the location and velocity of a nearby vehicle is received by sensor 102, and is provided to awareness engine 104 by the sensor. Awareness engine 104 analyzes the data to determine if the vehicle poses a threat of collision with a predetermined obstruction or obstructions. If such a threat is detected, alerting system 106, such as a warning light, is activated to emit suitable warnings and/or its operating characteristics altered in a predetermined manner, such as altering its brightness, on-off pattern, etc., in a manner calculated to alert the vehicle of the impending danger. This merging of ADS-B with anti-collision devices is significantly more effective at preventing collisions, thereby increasing the safety of navigation.

Similarly, sensor 102 may be configured to receive radar data as a sensor input for both airborne and maritime systems to detect potential collision threats. In this embodiment, radar data from sensor 102 provided to awareness engine 104 allows the awareness engine to determine if a vehicle poses a collision threat. If such a threat is detected, alerting system 106, such as a warning light, is activated in a manner calculated to alert the vehicle of the impending danger.

Wired and wireless communication networks, including the Internet, may also be utilized as sources for sensor 102 information. For example, sensor 102 may, via communication interface 108, query the Internet for the current (i.e., "real-time") and projected locations of various vehicles. Internet-derived target data is provided to awareness engine 104 by sensor 102 and the awareness engine determines if a vehicle poses a threat of collision. If such a threat is detected, alerting system 106, such as a warning light, is activated in a manner calculated to alert the vehicle of the impending danger.

As can be appreciated, the present invention is an "intelligent" collision avoidance system and, as such is an evolution of the traditional passive anti-collision device. In contrast to such passive warning lights, the present invention may include an alerting system 106 having a visually perceivable indicator 134 (FIG. 13) such as lighting system 10 or other anti-collision or obstruction light alerting system. Indicator 134 is understood to include any type of "visually perceivable" indicator, including those outside the range of human perception but visible with the aid of suitable equipment, such night vision imaging systems (NVIS).

Thus, for example, an alerting system 106 such as an anti-collision light 134 may be commanded to alter one or more of its operating characteristics (e.g., brightness, intensity, direction, flash rate, flash pattern, etc.) in the event of a potential collision detected by sensor 102 and evaluated by awareness engine 104. With system 100, no longer is collision avoidance solely dependent on an observer operating a vehicle proximate an associated obstructing structure. The present invention couples target-detection sensing capabilities with anti-collision warning devices, thereby making the present invention an active participant in collision avoidance. In the aforementioned system 100 wherein sensor 102 includes an ADS-B surveillance system, the system enables an alerting system 106 such as an anti-collision light to exhibit operating characteristics that are dependent upon the real-time risk of potential collisions.

The present invention is not limited to warning vehicles of potential collision hazards with structures such as buildings and communication towers. In fact, the present invention provides collateral capability beyond collision avoidance. An example of such collateral capabilities provided by the present invention includes traffic density alerts, whereby the lighting characteristics of airport lighting may be changed depending on the density of local traffic.

As another example, the present invention may be used for proximity reporting. With the ability to monitor traffic in close proximity, the present invention may be configured to monitor and report vehicles that close within a specified proximity. This aids to identify potentially dangerous situations and reduce the potential of a collision.

As yet another example, the present invention may be used to protect relatively mobile hazards from collisions by vehicle. Aviation databases are not updated in real-time. Consequently, relatively mobile, impermanent, obstacles are not typically included in aviation obstacle databases which are normally updated only every 28 days. Incorporating an ADS-B transceiver into sensor 102 of system 100 provides essentially the same functionality as updating the obstacle databases, effectively injecting the location of mobile obstacles into an aircraft's onboard anti-collision system.

Further details of example embodiments of the present invention are described below. These examples merely describe exemplary embodiments and are not intended to be limiting in any way.

Intelligent Runway Anti-Intrusion System (IRAS)

Perhaps the most challenging problem the FAA currently faces is reducing incidents of runway incursions. Replacing the taxiway identification lights at a runway "hold short" threshold (i.e., an aircraft runway ground staging point) prior to entering the runway, with intelligent anti-collision lighting within the scope of the present invention provides a way to reduce the number of runway incursion incidents. The IRAS comprises a system 100 incorporating a sensor 102 having ADS-B surveillance capability and an awareness engine 104. The ADS-B equipped sensor 102 and awareness engine 104 monitor for aircraft within a specified distance (such as, for example, about twice the length of the runway and within about 400 feet above the ground/touchdown zone height) and moving at a speed greater than about 40 knots. These distance and velocity variables, which may be made adjustable, enable the IRAS to determine if there are aircraft on the runway, departing, or arriving and then alter the operating characteristics of taxiway lighting to alert taxiing aircraft of the presence of aircraft on the runway. The IRAS does not require additional infrastructure and can utilize the pre-existing power provided to the taxiway lighting. No communications to the IRAS is required, as the ADS-B transceiver is self contained.

Operationally, the IRAS only changes state when there is a potentially conflicting aircraft in the runway environment; otherwise the light is a default color and intensity for normal taxiway lighting. When a pilot taxis up to the runway hold short threshold and no aircraft are present in the runway environment the IRAS will be the default taxiway color (i.e., blue) and intensity. However, if there is an aircraft in the runway environment the IRAS may change color (i.e., to red, for example), and/or start blinking if the aircraft in the runway environment poses a collision threat to the taxiing aircraft.

Intelligent Tower Anti-Collision Lighting (ITAL)

Figure 13:
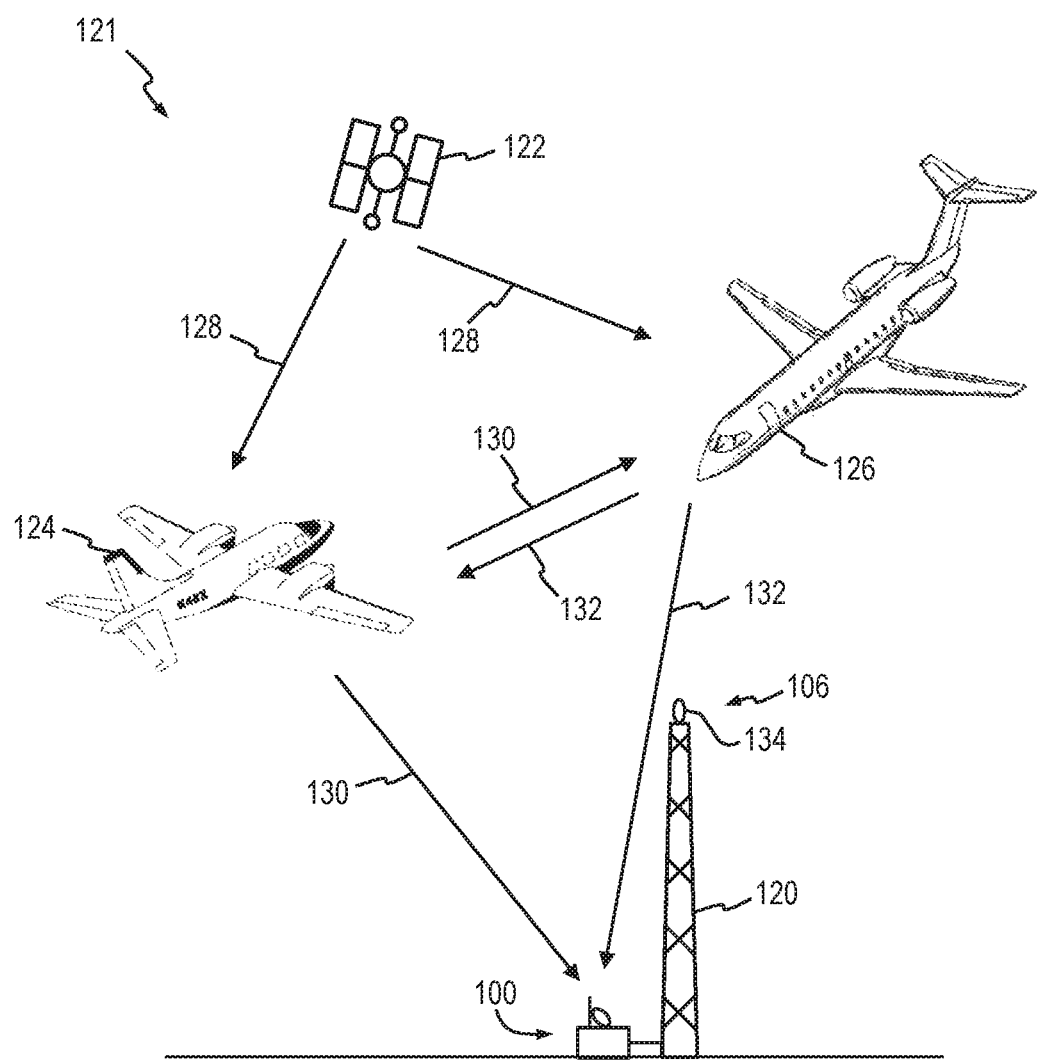
FIG. 13 shows an intelligent runway anti-intrusion system according to an embodiment of the present invention.

Current tower obstacle lighting typically consists of a flashing light of a specified intensity, interval, and color. The light does not have the capacity to alter its operating characteristics based on the proximity of aircraft. Incorporating "intelligence" into tower lighting enhances the effectiveness of anti-collision tower lighting. With reference to FIGS. 11 through 13 together, a tower 120 includes a collision avoidance system 100 according to an embodiment of the present invention. System 100 includes an alerting system 106 mounted to tower 120, shown in FIG. 13 as an obstruction light 134.

An ADS-B navigation system 121 comprises a satellite navigation system 122, such as a Global Navigation Satellite System (GNSS). Aircraft utilizing the ADS-B system, such as aircraft 124, 126, generate information relating to their current position based upon signals 128 from satellite navigation system 122. Aircraft 124, 126 broadcast their position information, as at 130, 132. The position information 130 of aircraft 124 may be received by aircraft 126. Likewise, position information 132 of aircraft 126 may be received by aircraft 124. Each aircraft is thus provided with position information relating to the other aircraft. In addition, system 100 receives position information 130, 132 relating to aircraft 124, 126 respectively via sensor 102. The position information is provided to awareness engine 104, which determines whether a threat of a collision between either of aircraft 124, 126 with tower 120 exists. If it is determined that a threat exists, alerting system 106 is activated in a predetermined manner to alert the aircraft.

In one embodiment, the anti-collision tower light 134 of alerting system 106 may be controlled in such a manner to change its operating state from standard collision avoidance variables (e.g., color, intensity, flash frequency) to an alert condition which will alert pilots that they are too close to the tower. The alert condition may be one or more of a changed color, increased intensity, and increased flash frequency. The on-off duty cycle of indicator 134 may also be altered to draw attention to the obstruction 120 including, but not limited to, Morse code signals.

In some embodiments of the present invention system 100 may directly alert the aircraft 124, 126 to the presence of an obstacle such as tower 120. In this embodiment, tower 120 will not continuously broadcast its location, but rather will only broadcast an alert when a detected aircraft is determined to be at risk of a collision with the tower. When an aircraft is at risk the ITAL system may alert the aircraft via ADS-B using alerting system 106 and/or communication interface 108 in any manner previously described.

Intelligent Mobile Obstruction Lighting (IMOL)

Databases containing information relating to obstacles to aviation are normally updated every 28 days. Between these updates it is incumbent upon the pilot to obtain obstacle updates via the Notices to Airmen (NOTAM system) administered by the FAA. A drawback of the NOTAM system is that it is not always reliable for delivering timely obstacle information to pilots. Furthermore, there is no reasonable method to update pilots in real-time of changes to obstacles while airborne. Thus, relatively "mobile" obstacles (e.g., movable stationary obstacles, repositionable obstacles, and moving obstacles), such as large cranes, present a unique challenge to this system. Such obstacles may not be in a given location for a sufficient period of time to be added to an obstacle database, or they may be moved subsequent to being added to the database. An Intelligent Mobile Obstruction Lighting (IMOL) system overcomes these drawbacks with a collision avoidance system 100 having a sensor 102 that includes an ADS-B system 121. With system 100 incorporated with such obstacles the transient and mobile nature of the obstacle is not a limitation to alerting aircraft to potential collision threats. Using ADS-B system 121 the IMOL system may detect aircraft in close proximity to the obstacle and change the state of alerting system 106 in any manner previously described to alert the aircraft, including issuing a warning via ADS-B signals transmitted to the aircraft as a terrain alert.

Intelligent Directed Lighting (IDL)

The proliferation of obstructions such as towers and the associated hazard lighting has reduced the effectiveness of the lighting by making it commonplace. Pilots are thus accustomed to seeing a plurality of obstacle lights and may not register particular obstruction lights as an indication of an imminent hazard in time to avoid a dangerous situation. By adding "intelligence" to a collision avoidance system an alerting system 106 incorporating an anti-collision light 134 may be configured to alter its operating characteristics in a predetermined attention-getting manner and thus attract the attention of a pilot. In addition to changing one or more of the intensity, color, flash rate and on-off duty cycle of an anti-collision light, a visually perceivable light may be aimed or otherwise directed at an aircraft and, optionally, the intensity increased in order to alert an aircraft of a risk of collision. Using a sensor 102 equipped with ADS-B the awareness engine 104 of system 100 in the IDL is able to determine the azimuth, elevation, and range to a target aircraft. The IDL utilizes this target information to cause alerting system 106 to aim or direct a focused beam of high-intensity light at the intruding aircraft to alert the aircraft of an impending collision. Alerting system 106 may comprise, without limitation, a gimbaled light, mechanical, electro-mechanical, electrical and electronic positioning devices to aim a light in a determinable manner, light-focusing devices, and selectively actuated lights.

System 100 is capable of providing sophisticated functionality by integrating emerging technologies into a novel system for the benefit of the traveling public. This integration is consistent with standard development and integration of object orientated endeavors providing a modular, scalable, and reliable system. Strong, clear interfaces are preferably maintained between the hardware and software modules to further enhance the modularity of the system.

With reference to FIG. 13, ADS-B system 121 relies upon satellite-based global positioning system (GPS) navigation equipment on board an aircraft to determine the aircraft's precise location in space. This location information may be combined with other information such as the type of aircraft, its speed, its identification number, and whether the aircraft is turning, climbing, or descending. The information is then broadcast by the aircraft several times a second in an "ADS-B Out" transmission. Other aircraft and ground stations that are equipped with "ADS-B In" receivers and within range (typically about 150 miles) receive these ADS-B Out broadcasts. The ground stations may combine the ADS-B Out broadcasts received from different local area aircraft with additional location information received from, for example, ground radar data relating to non-ADS-B equipped aircraft, and rebroadcast the data out to aircraft in the area as air traffic information. The air traffic information, along with other information sent by the ground station, such as weather information, may then be displayed in the cockpits of aircraft that are equipped with ADS-B In receivers.

From the foregoing, it is apparent that ground stations form a key element of the ADS-B system 121. However, ADS-B ground stations are lacking in many remote areas having little infrastructure or relatively low levels of aircraft traffic. Likewise, a less-than-desirable number of ADS-B ground stations are found in areas with adverse terrain, such as mountainous and desert areas. On the other hand, it is not uncommon to find communications systems and obstruction lighting systems in many of these remote areas.

Figure 14:
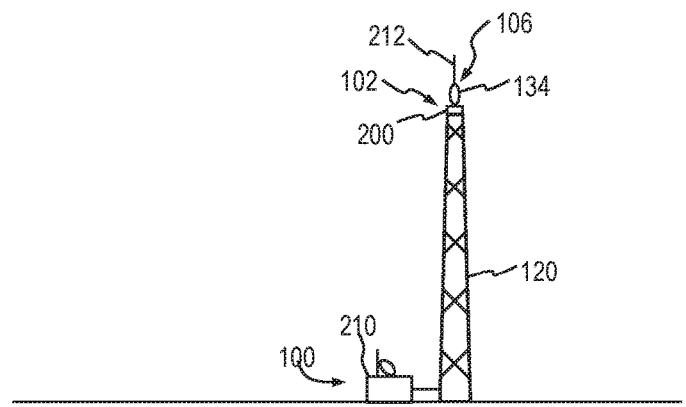
FIG. 14 shows a tower obstruction with a lighting and collision alerting system according to an embodiment of the present invention.
Figure 15:
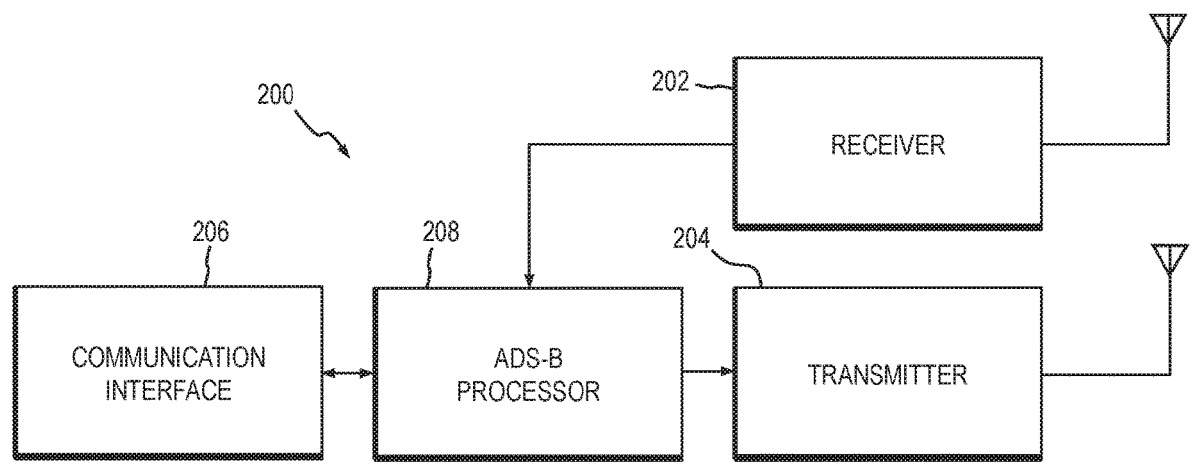
FIG. 15 is a schematic block diagram of a ground station for an Automatic Dependent Surveillance-Broadcast (ADS-B) surveillance system according to an embodiment of the present invention.

With reference to FIGS. 14 and 15, in one embodiment of the present invention an alerting system 106 in the form of an obstruction light 134 is configured to include a sensor 102 in the form of an ADS-B ground station 200. Details of ground station 200 are shown in FIG. 15 according to an embodiment of the present invention. As shown, ground station 200 includes a receiver 202, a transmitter 204, a communication interface 206 and an ADS-B processor 208.

Receiver 202 may be any type of receiver configured to receive ADS-B Out transmissions. In United States airspace, ADS-B In and Out information is available on two separate frequencies, 1090 MHz and 978 MHz. The 1090 MHz frequency is used by Mode-S transponders, and when a transponder is equipped with compliant hardware and software (an ADS-B approved version of "ES" or "Extended Squitter"), the transponder itself acts as an ADS-B transceiver. The 978 MHz frequency, sometimes referred to as a "UAT" (Universal Access Transceiver), is the frequency reserved for aircraft flying below Fight Level 180; it has a much higher bandwidth than 1090 MHz (the frequency is far less congested) and, therefore more data can be transmitted to the aircraft from the ground.

In airspace other than the United States, the 978 MHz frequency is not currently authorized for use in ADS-B. Due to congestion problems, however, this restriction may be lifted in the future.

Transmitter 204 may be any type of transmitter suitable for transmitting ADS-B signals to ADS-B In receivers.

Communication interface 206 facilitates communications to and, in some cases, from system 200. The communications may include receiving data from sources external to the system including, but not limited to, data (such as radar data relating to targets, weather data, etc.), control signals, commands, fault corrections, and instruction or program updates. The external sources may include, but are not limited to, computing devices, wired and wireless networks, proprietary information-collecting devices, the Internet, radio receivers, and so on. Such external sources may be located near system 200, or may be remote from the system and coupled to the system by any communication means now known or later invented. Communication interface 206 may also be configured to transmit to external sources status information relating to system 200, including fault information. Communication interface 206 may be variously configured to receive and/or transmit analog signals as well as digital data, and may be configured to communicate using any data protocol or standard now known or later developed.

ADS-B Processor 208 receives target data from receiver 202 and any relevant data from any applicable external sources via communication interface 206. The data are processed in a predetermined manner to generate an ADS-B ground station signal containing, without limitation, aircraft traffic alerts, terrain hazard alerts, and weather information. The ADS-B ground station signal is broadcast via transmitter 204 for reception by ADS-B In receivers of the target vehicles.

In various forms of ground station 200, some (or portions) of one or more of receiver 202, transmitter 204, communication interface 206 and ADS-B processor 208 may be located remote or external to alerting system 106. In addition, receiver 202 and transmitter 204 may be combined to form a transceiver.

Figure 16:
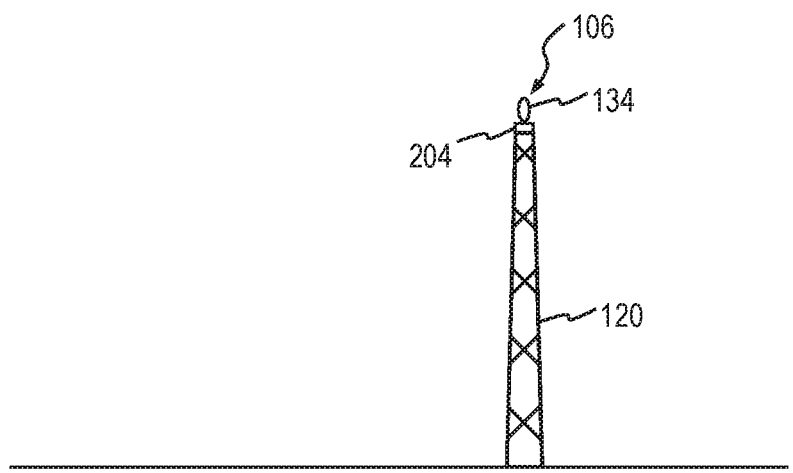
FIG. 16 shows a tower obstruction with a lighting and collision alerting system according to another embodiment of the present invention.

With reference to FIG. 16, in still another embodiment of the present invention an ADS-B transmitter 204 may be integrated with an alerting system 106 such as an anti-collision light 134 and configured to continuously transmit, thereby marking in ADS-B system 121 (FIG. 13) the obstacle to which the anti-collision light is mounted. In this manner the obstacle is displayed as a terrain alert in the cockpit of nearby aircraft. Alerting system 106 may also be configured such that at least one of its operating characteristics is altered in the event of a detected threat of a collision by system 100, as detailed above.

With continued reference to FIGS. 14 and 15, in an alternate embodiment ground station 200 may be configured to function as a repeater. When so configured, receiver 202 receives an ADS-B signal. Ground station 200, additionally utilizing ADS-B processor 208 as a repeater controller, re-transmits the received ADS-B signal with transmitter 204. The re-transmitted ADS-B signal may be re-transmitted by transmitter 204 at a relatively high level, thereby extending the effective range of the original ADS-B signal. When functioning as a repeater, ground station 200 may often take advantage of the relative height of an associated tower 120 to forward the received ADS-B signal. For example, ground station 200 may be located at or near the top of tower 120, and may optionally be integrated with an indicator 134 such as an obstruction anti-collision light. Alternatively, ground station 200 may be located at a base mount 210, with transmitting and receiving antennae 212 remotely located at or near at or near the top of tower 120. The transmitting and receiving antennae 212 may also be integrated with an indicator 134, if desired. The repeater function of ground station 200 may be utilized to extend ADS-B coverage into relatively remote areas and/or overcome obstacles that would otherwise limit the range of the ADS-B signal.

While this invention has been shown and described with respect to a detailed embodiment thereof, it will be understood by those skilled in the art that changes in form and detail thereof may be made without departing from the scope of the claims of the invention. For example, although the disclosed invention is described in terms of use as an obstruction light for the purpose of illustration, one skilled in the art will appreciate that the disclosed invention may be utilized to advantage in any suitable type of lighting and collision alerting systems.

What is claimed is:

1. A collision avoidance system, comprising:
   a sensor adapted to:
      detect at least one vehicle in a vicinity of a predetermined area, and
      generate a target data relating to the at least one vehicle;
   an awareness engine adapted to:
      receive the target data from the sensor, and
      evaluate the target data for a threat of a collision; and
   an alerting system adapted to alert the at least one vehicle in an event of a threat of a collision, the alerting system being activated by the awareness engine.

2. The collision avoidance system of claim 1 wherein the sensor is configured to detect Automatic Dependent Surveillance-Broadcast (ADS-B) signals transmitted by the at least one vehicle.

3. An airport traffic collision avoidance system, comprising:
   a vehicle sensor configured to:
      detect a signal transmitted by at least one vehicle in a vicinity of a predetermined area of an airport,
      use the detected signal to determine at least one of a position, direction, and velocity of the vehicle, and
      generate a target data relating to the at least one vehicle;
   an awareness engine adapted to:
      receive the target data from the sensor, and
      evaluate the target data for a threat of a collision with another ground or airborne vehicle, or an obstruction; and
   an alerting system adapted to:
      receive a command from the awareness engine, and
      alert the at least one vehicle in an event of a threat of a collision in the predetermined area,
      the alerting system being selectably activated by the command from the awareness engine.

4. The airport traffic collision avoidance system of claim 3 wherein the awareness engine comprises an evaluation subsystem, the evaluation subsystem being adapted to:
   receive the target data,
   determine a risk of a collision with the at least one vehicle, and
   provide evaluation results to the alerting system.

5. The airport traffic collision avoidance system of claim 4, wherein the at least one vehicle comprises a plurality of vehicles, the evaluation subsystem being further adapted to determine, from corresponding target data, the risk of a collision between the vehicles.

6. The airport traffic collision avoidance system of claim 4 wherein the alerting system is activated to issue a warning when the risk of a collision exceeds a predetermined threshold.

7. The airport traffic collision avoidance system of claim 3 wherein the alerting system further comprises a visually perceivable indicator.

8. The airport traffic collision avoidance system of claim 7 wherein at least one operating characteristic of the indicator is altered in the event of a threat of a collision.

9. A collision avoidance system for a movable obstacle, comprising:
   a sensor configured to:
      detect a signal transmitted by at least one vehicle in a vicinity of a predetermined area of a movable obstacle,
      use the detected signal to determine at least one of a position, direction, and velocity of the vehicle, and
      generate a target data relating to the at least one vehicle;
   an awareness engine adapted to:
      receive the target data from the sensor, and
      evaluate the target data for a threat of a collision with the movable obstacle; and
   an alerting system adapted to:
      receive a command from the awareness engine, and
      alert the at least one vehicle in an event of a threat of a collision with the movable obstacle,
      the alerting system being selectably activated by the command from the awareness engine.

10. The collision avoidance system of claim 9 wherein the awareness engine comprises an evaluation subsystem, the evaluation subsystem being adapted to:
receive the target data,
determine a risk of a collision with the at least one vehicle, and
provide evaluation results to the alerting system.

11. The collision avoidance system of claim 10, wherein the at least one vehicle comprises a plurality of vehicles, the evaluation subsystem being further adapted to determine, from corresponding target data, the risk of a collision between the vehicles.

12. The collision avoidance system of claim 10 wherein the alerting system is activated to issue a warning when the risk of a collision exceeds a predetermined threshold.

13. The collision avoidance system of claim 9 wherein the alerting system further comprises a visually perceivable indicator.

14. The collision avoidance system of claim 13 wherein characteristics of the indicator are altered in a predetermined, visually perceivable manner.

15. The collision avoidance system of claim 14 wherein an intensity of the indicator is altered by the alerting system in the event of a threat of a collision with the movable obstacle.

16. The collision avoidance system of claim 14 wherein a color of the indicator is altered by the alerting system in the event of a threat of a collision with the movable obstacle.

17. The collision avoidance system of claim 14 wherein a flash rate of the indicator is altered by the alerting system in the event of a threat of a collision with the movable obstacle.

18. The collision avoidance system of claim 14 wherein an on-off duty cycle of the indicator is altered by the alerting system in the event of a threat of a collision with the movable obstacle.

19. The collision avoidance system of claim 14 wherein the indicator is aimed or directed in a predetermined manner in the event of a threat of a collision with the movable obstacle.

20. The collision avoidance system of claim 14 wherein an intensity of the indicator is increased in the event of a threat of a collision with the movable obstacle.

* * * * *